UNITED STATES PATENT OFFICE 2,676,965

METHOD OF PREPARING 2-MERCAPTO-4-TERTIARY AMINOPYRIMIDINES

George H. Hitchings, Tuckahoe, and Peter Byrom Russell, Crestwood, N. Y., assignors to Burroughs Wellcome & Co. (U. S. A.) Inc., Tuckahoe, N. Y., a corporation of New York No Drawing. Application December 12, 1951, Serial No. 261,395

4 Claims. (Cl. 260—256.5)

1

Our present invention relates to 2-mercapto-4-aminopyrimidine derivatives unsubstituted at the 5 position and to a novel and valuable method of preparing them. The compounds of the present invention are valuable pharmaceuticals and provide useful intermediates as routes for the preparation of other 4-aminopyrimidine derivatives. This application is a continuation-in-part of our copending application Serial No. 33,678, now abandoned.

Prior methods of forming 4-aminopyrimidine derivatives have presented substantial problems because of the nearly equivalent reactiveness of halogen substituents in the 2 and 4 positions of the pyrimidine ring.

According to this invention a valuable class of 2-mercapto-4-secondary aminopyrimidine compounds are formed by the reaction of a 2,4-dimercapto pyrimidine containing no substituent at the 5 position with a secondary amine containing at least a single methyl group. This reaction may be represented by the equation

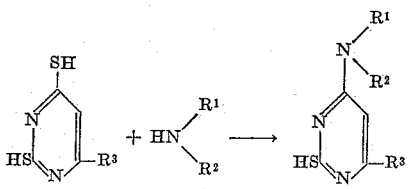

wherein $R^1$ is a methyl group, $R^2$ is a radical selected from the class consisting of alkyl and monocyclic aryl and aralkyl radicals, $R^3$ is a radical selected from the class consisting of alkyl, aryl and aralkyl radicals and hydrogen, and wherein $NR^1R^2$ becomes a member of the class of heterocyclic amino radicals when $R^1$ and $R^2$ are joined. The improved method is based on the discovery that in the 2 and 4 positions the mercapto groups possess unequal activities thereby allowing the stepwise replacement by secondary amines containing at least one methyl group. When the 2,4-dimercapto pyrimidine contains a substituent at the 5 position the reaction with secondary amines does not occur. Moreover, even in cases where the 2,4-dimercapto pyrimidine is unsubstituted in the 5 position of the pyrimidine ring the reaction does not proceed with secondary amines which do not contain at least a single methyl group. The situation is different when the 2,4-dimercapto pyrimidines are reacted with ammonia or primary amines and these reactions form the subject matter of other applications by the present applicants. The starting dimercapto pyrimidine derivatives are readily obtainable by the method described in U. S. Patent No. 2,415,793 by Hitchings and Elion, which in conjunction with the present discovered method provides a convenient synthesis for the preparation of many valuable 4-aminopyrimidine derivatives.

A considerable variety of dimercapto pyrimidine derivatives are amenable to the present reaction having for example the general tautomeric formulae

and

which undergo similar reactions with the amino derivatives and wherein $R^3$ has the same value as previously indicated. Where there is no substituent at the 5 position of the ring and when the secondary amine contains at least a single methyl group at the nitrogen the critical sulphur atom of the 2,4-dimercaptopyrimidine is readily replaced.

The desired 2-mercapto-4-aminopyrimidine compound may be readily formed by merely heating the selected reactants under suitable conditions of temperature and pressure depending on the nature of the amine until the reaction is completed. In many cases the reaction mixture is simply heated or refluxed in an open system depending on the boiling point of the amine until the reaction is complete.

A considerable excess of amine is added to the reaction mixture. Suitable proportions for carrying out the reaction may be in general about three mols of the base to about one mol of the 2,4-dimercaptopyrimidine derivative. The mixture becomes homogeneous at once with the evolution of heat due to initial salt formation. Application of heat is usually continued for a period of about three hours, whereupon the reaction is complete.

The desired 2-mercapto-4-aminopyrimidine compound may be isolated from the reaction mixture by a number of methods including simple filtration from solution, evaporation of the solution to dryness followed by crystallization from water of alcohol and simple precipitation of the material from solution with water or in some cases by removal of the excess base from the reaction mixture with ether. The preferred method of isolating the product will depend largely on the physical properties of the particular base used in the reaction.

The presence or absence of a substituent at the 6 position of the pyrimidine ring does not seem to materially affect the course of reaction as will be apparent from the specific examples to follow.

The aliphatic secondary amines which contain an N-methyl group react readily with the 2,4-dimercaptopyrimidine to give the corresponding 4-amino-pyrimidine derivatives. Where $R^1$ is greater than methyl the reaction does not occur even though considerably more vigorous conditions are utilized than required with the primary amines. Thus diethylamine did not react with 2,4-dimercaptopyrimidine even at 140° in a sealed tube where from 65 percent of the dithiouracil was recovered in the reaction mixture unchanged. When di-n-amylamine containing a small amount of mono-n-amylamine was combined with 2,4-dimercaptoaminopyrimidine at a temperature of 180°, the only isolated product consisted in a small amount of 2-mercapto-4-n-amylaminopyrimidine. On the other hand, dimethylamine reacted readily with 2,4-dimercaptopyrimidine when combined in a 33 percent alcoholic solution at a temperature of 120° for a period of three hours to give the corresponding 2-mercapto-4-dimethylaminopyrimidine in good yield.

In accordance with the present invention, the cyclic secondary amines appear to undergo the reaction in a normal manner and without difficulty. Thus the combination of morpholine with 2,4-dimercaptopyrimidine under suitable conditions gave 2-mercapto-4-morpholinopyrimidine in approximately 70 percent yield.

In a similar manner, piperidine reacted with 2,4-dimercaptopyrimidine to give 2-mercapto-piperidinopyrimidine also in approximately 70 percent yield. Moreover, N-methyl piperazine readily formed 2-mercapto-4-N-methylpiperazinopyrimidine in a slightly lower yield.

The following examples illustrate specific instances of the various applications in accordance with the present invention.

Example 1

2.6 g. of dithiouracil was mixed with 5 g. of piperidine and the mixture refluxed for a period of three hours. The excess piperidine was washed away with ether and the residue washed with water and filtered. The product crystallized from aqueous solution in short needle prisms was 2-mercapto-4-(N-piperidino)pyrimidine in approximately 60 percent yield of melting point 227°–228°.

Example 2

Morpholine was reacted under similar conditions with 2,4-dimercaptopyrimidine to give 2-mercapto-4-(4-morpholino)pyrimidine.

Example 3

0.65 g. dithiouracil and 1.5 g. N-methylpiperazine were mixed at 100° for a period of three hours. The mixture was diluted with ether, the residue washed with water and recrystallized from ethyl alcohol to give 2-mercapto-4-N-methylpiperazinopyrimidine in the form of colorless needles having a melting point of 257°.

Example 4

1.3 g. dithiouracil was dissolved in a 10 cc. solution of dimethylamine in 33 percent alcoholic solution in a sealed tube for three and one-half hours at 130°. When the reaction mixture was chilled, a crystalline material consisting of 2-mercapto-4-dimethylaminopyrimidine in yield of about 55 percent and having a melting point of 280°–283° was obtained. In the same way 6-methyldithiouracil gave 2-mercapto-4-dimethylamino-6-methylpyrimidine.

Example 5

Dithiouracil was reacted with methylaniline at 180° in an open system to give a 30 percent yield of 2-mercapto-4-methylanilinopyrimidine.

Example 6

In a sealed tube 2.2 g. of methyl-n-propylamine and 1.44 g. of dithiouracil were heated at 100° for 10 hours. The tube was opened, hydrogen sulfide and excess amine were removed in vacuo and the product, 2-mercapto-4-methylpropylaminopyrimidine was isolated in 50 percent yield of melting point 194°–195°.

The above mentioned examples are illustrative of specific conditions which may be conveniently utilized in carrying out the reaction according to the invention. It will be observed that the conditions are varied according to the nature of the secondary amine in the interest of optimum results. The nature of substituents at $R^2$ and $R^3$ may apparently be widely varied without materially affecting the course of reaction which is governed mainly by the differential reactiveness of the mercapto groups, the absence of substituents at the 5 position of the pyrimidine ring, and the presence of at least a single methyl group in the secondary amine.

Further examples of compounds which may be readily prepared in accordance with the invention by merely heating the reactants together are as follows:

(7) 2-mercapto-6-p-chlorophenyl-4-dimethylaminopyrimidine (8) 2-mercapto-6-o-chlorophenyl-4-(N'-piperidino)pyrimidine (9) 2-mercapto-6-n-butyl-4-(1'-ethylpiperazine-4')pyrimidine

(10) 2-mercapto-6-methyl-4-n-butyl-methylaminopyrimidine

(11) 2-mercapto-6-methyl-4-n-octadecyl-methylaminopyrimidine

(12) 2-mercapto-6-methyl-4-n-dodecyl-methylaminopyrimidine

(13) 2-mercapto-4-benzylmethylaminopyrimidine

(14) 2-mercapto-4-anisylmethylaminopyrimidine

(15) 2-mercapto-4-homoanisylmethylaminopyrimidine

(16) 2-mercapto-4-homoveratrylmethylaminopyrimidine

(17) 2-mercapto-6-methyl-4-benzylmethylaminopyrimidine

(18) 2-mercapto-6-methyl-4-homoanisylmethylaminopyrimidine

(19) 2-mercapto-6-methyl-4-homoveratrylmethylaminopyrimidine

(20) 2-mercapto-6-phenyl-4-benzylmethylaminopyrimidine

(21) 2-mercapto-6-phenyl-4-anisylmethylaminopyrimidine

(22) 2-mercapto-6-phenyl-4-homoveratrylmethylaminopyrimidine

(23) 2 - mercapto - 4 - (1' - benzyl piperazine-4') pyrimidine
(24) 2 - mercapto - 6 - phenyl - 4 - (1' - methyl-piperazine-4') pyramidine

We claim:

1. A method of forming 2-mercapto-4-tertiary aminopyrimidines which comprises reacting a 2,4-dimercapto pyrimidine unsubstituted at the 5 position with a secondary amine containing at least a single methyl group.

2. The method of claim 1 wherein a substantial excess of amine is added to the reaction mixture.

3. The method of claim 1 wherein about 3 mols of the base are employed to every mol of the 2,4-dimercapto pyrimidine.

4. A method of forming compounds of the formula

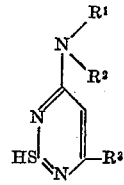

wherein R¹ is a methyl group, R² is a radical selected from the class consisting of alkyl and monocyclic aryl and aralkyl radicals, R³ is a radical selected from the class consisting of alkyl, aryl and aralkyl radicals and hydrogen, and wherein NR¹R² becomes a member of the class of heterocyclic amino radicals when R¹ and R² are joined, which comprises reacting a dithiopyrimidine of the formula

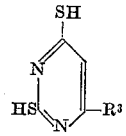

with a secondary amine of the formula

wherein R¹, R² and R³ have the above mentioned values.

References Cited in the file of this patent

Schlenker, Ber. Deut. Chem. 34, 2821 (1901).
Gabriel et al., Ber. Deut. Chem., 32, 2930 (1899).